(12) United States Patent
Huhnd et al.

(10) Patent No.: US 8,806,929 B2
(45) Date of Patent: Aug. 19, 2014

(54) ENGINE SIMULATOR FOR WIND TUNNEL MODELS, METHOD FOR MANUFACTURING A HEATER COATING ON A FLOW-TYPE BODY AND USE OF A COATING WITH A CONDUCTIVITY ADDITIVE ON A FLOW-TYPE BODY

(75) Inventors: Michael Huhnd, Thedinghausen (DE); Detlev Dau, Bremen (DE); Roman Melachrinos, München (DE); Hans Perner, Delmenhorst (DE); André Fueser, Bremen (DE)

(73) Assignee: Airbus Operations GmbH (DE)

( * ) Notice: Subject to any disclaimer, the term of this patent is extended or adjusted under 35 U.S.C. 154(b) by 127 days.

(21) Appl. No.: 13/484,454

(22) Filed: May 31, 2012

(65) Prior Publication Data

US 2012/0304753 A1 Dec. 6, 2012

Related U.S. Application Data

(60) Provisional application No. 61/491,439, filed on May 31, 2011.

(30) Foreign Application Priority Data

May 31, 2011 (DE) .......................... 10 2011 102 877

(51) Int. Cl.
*G01M 15/14* (2006.01)
(52) U.S. Cl.
USPC ......................... 73/118.03; 73/112.01; 73/147
(58) Field of Classification Search
USPC ........ 73/112.01, 118.01, 118.02, 118.03, 147
See application file for complete search history.

(56) References Cited

U.S. PATENT DOCUMENTS

| | | | | |
|---|---|---|---|---|
| 4,034,604 | A | * | 7/1977 | Decher et al. .................... 73/147 |
| 4,534,216 | A | * | 8/1985 | Fasano et al. .................... 73/147 |
| 4,821,566 | A | | 4/1989 | Johnston et al. |
| 5,293,775 | A | * | 3/1994 | Clark et al. ................. 73/116.03 |
| 5,396,793 | A | * | 3/1995 | Colletti ..................... 73/116.03 |
| 6,237,395 | B1 | * | 5/2001 | Helgeson ..................... 73/23.31 |
| 8,006,544 | B2 | * | 8/2011 | Holmes et al. ............. 73/112.01 |
| 8,082,778 | B2 | * | 12/2011 | Riekers et al. ............. 73/118.02 |
| 8,281,649 | B1 | * | 10/2012 | Crutchfield et al. ........ 73/112.01 |
| 8,573,038 | B1 | * | 11/2013 | Crutchfield et al. ........ 73/112.01 |
| 2008/0073609 | A1 | | 3/2008 | Akkermann |
| 2009/0133381 | A1 | * | 5/2009 | Holmes et al. .................. 60/204 |

(Continued)

FOREIGN PATENT DOCUMENTS

| | | |
|---|---|---|
| DE | 102 53 844 A1 | 6/2004 |
| DE | 10 2006 044 996 A1 | 4/2008 |

(Continued)

*Primary Examiner* — Eric S McCall
(74) *Attorney, Agent, or Firm* — Lerner, David, Littenberg, Krumholz & Mentlik, LLP

(57) ABSTRACT

An engine simulator for wind tunnel models exhibits a turbine with an inlet for a pressurized fluid and an outlet for a relieved fluid, a flow-type body arranged downstream from the turbine, a jacket that at least partially envelops the flow-type body with the formation of a gap, and at least two electrodes. A downstream end of the flow-type body is provided with a heater coating comprised of a matrix material that contains a conductivity additive and is connected with the electrodes for applying an electrical voltage. This may make it possible to prevent ice formation on the trailing edge of the flow-type body.

7 Claims, 4 Drawing Sheets

(56) References Cited

U.S. PATENT DOCUMENTS

| | | | |
|---|---|---|---|
| 2010/0101315 A1* | 4/2010 | Riekers et al. | 73/118.02 |
| 2011/0138772 A1* | 6/2011 | Zitouni et al. | 60/226.1 |
| 2011/0159396 A1 | 6/2011 | Kleemann et al. | |
| 2012/0025131 A1 | 2/2012 | Forero | |
| 2012/0152007 A1* | 6/2012 | Holmes et al. | 73/112.01 |
| 2014/0053641 A1* | 2/2014 | Brostmeyer | 73/112.01 |

FOREIGN PATENT DOCUMENTS

| | | |
|---|---|---|
| DE | 10 2009 002 184 A1 | 5/2010 |
| WO | 2010/006730 A1 | 1/2010 |
| WO | 2010066730 A1 | 6/2010 |

* cited by examiner

ENGINE SIMULATOR FOR WIND TUNNEL MODELS, METHOD FOR MANUFACTURING A HEATER COATING ON A FLOW-TYPE BODY AND USE OF A COATING WITH A CONDUCTIVITY ADDITIVE ON A FLOW-TYPE BODY

CROSS-REFERENCE TO RELATED APPLICATIONS

This application claims the benefit of the filing date of U.S. Provisional Patent Application No. 61/491,439 filed May 31, 2011, the disclosure of which is hereby incorporated herein by reference.

TECHNICAL AREA

The invention relates to an engine simulator for wind tunnel models, a method for manufacturing a heater coating on a flow-type body of an engine simulator, and the use of a heater coating comprised of a matrix material with a conductivity additive to prevent the accretion of ice on a flow-type body of a wind tunnel model.

BACKGROUND OF THE INVENTION

In order to validate a configuration of an aircraft having one or more engines, use is often made of wind tunnel models with engine simulators, which exhibit a ducted fan and flow-through jacket for wind tunnel models of modern commercial aircraft. Simulators like these are operated using a mechanically simple compressor drive, in which compressed air is relieved in a rotatably mounted turbine with one or more turbine stages, wherein the turbine is made to rotate. The rotation drives the ducted fan connected by a shaft with the turbine so as to generate a bypass flow. Due to the compressed air having been relieved in the turbine, the stream of air exiting the turbine via a nozzle-like flow-type body exhibits a distinctly lower temperature than the bypass flow measuring up to e.g. −100° C., and mixes in with the bypass flow in the vicinity of an emersion point of the flow-type body. Because of the low temperature of the mixed air, the local mixing yields at least a regional condensation of bypass flow moisture, which accumulates in the form of ice on a trailing edge of the flow-type body exposed to a flow. The icing of the trailing edge influences the state of flow at the outlet of the engine simulator, and hence the measured data from the performed wind tunnel tests.

BRIEF SUMMARY OF THE INVENTION

An engine simulator for wind tunnel models is provided exhibiting a turbine with an inlet for a pressurized fluid and an outlet for a relieved fluid, a flow-type body situated downstream from the turbine, a jacket that at least partially envelops the flow-type body with the formation of a gap, and at least two electrodes, wherein a downstream end of the flow-type body is provided with a heater coating (in the following also referred to as "heated coating") comprised of a matrix material that contains a conductivity additive and is connected with electrodes for applying an electrical voltage.

An engine simulator of this type is set up in such a way as to generate as realistic as possible of an engine-induced flow scenario in the wind tunnel by rotating the turbine while pressurized fluid, for example compressed air, is being conveyed to the inlet. The relieved fluid exiting the turbine via the outlet passes through or over the downstream flow-type body at which a mixing zone arises, in which the relieved fluid is locally thoroughly mixed with the bypass flow generated by the ducted fan. The condensate produced by the mixing process, which would accumulate as ice at the downstream end of the flow-type body, is continuously exposed to heat by the heated coating, so that it does not have a tendency to adhere to the flow-type body as ice, but rather leaves the flow-type body in a liquid or vapor phase, influenced by the air flow.

The heater coating may preferably be realized with a fluid, curable and, for example, resin-like matrix material in which a conductivity additive is dispersed, thereby forming a conductive layer. By applying a voltage from a direct current or alternating current voltage source to the heater coating via the electrodes, a current can be made to flow through the heater coating, which leads to a dissipation power in the form of heat as the result of a resistance determined by the conductivity additive. The special advantage to such a heater coating lies in the fact that using conventional resin-like matrix materials enables the realization of very thin layers, which can be applied to one end, for example a sharp edge, of a flow-type body in any form desired and at any bending radii desired through immersion or spraying. The conductivity additive may here exhibit a carbon-based design, for example taking the form of dispersed carbon particles.

A suitable heater coating material of the kind described in detail in WO 2010/066730 A1, for example, has a barely noticeable influence on the aerodynamic properties of the engine simulator when applied in a very thin coating, in contrast to the electrical heating films that would have to be adhesively bonded to an inner or outer surface of the flow-type body in a region proximate to an outlet edge. Such heating films known from prior art may also exhibit a limited mechanical flexibility, and hence a very limited dimensional adjustability, so that they cannot be entirely draped around a trailing edge of a flow-type body. In addition, a proposed heater coating must be rated as clearly advantageous relative to an electrically operated heated filament also known in prior art, which is only able to heat a rather narrow area on a trailing edge of the flow-type body.

In an advantageous embodiment, at least one of the two electrodes is designed as a metal band. The metal band may consist of the softest possible, easily bendable and readily conductive metal, with especially copper or aluminum being possible, wherein a tin coating can also be applied to the metal band as an option. Such a metal band can be applied to, on or under the coating, flexibly contacting the flow-type body. Because it is readily moldable, an electrode designed as a metal strip can be adjusted to the shape of the end of the flow-type body, and would thus have the least possible influence on the flow in the region of the end, for example as the result of a bump or the like. For purposes of attachment to the flow-type body, the metal band could exhibit an adhesive film on the lower side, which upon removal of a protective layer makes it possible to securely bond the metal band to the flow-type body.

In another embodiment, at least one of the electrodes is arranged between the heater coating and the region of the end of the flow-type body covered by the heater coating. As a consequence, the electrode is completely encapsulated by the coating on the flow-type body, and protected against detachment. In addition, the encapsulation realizes a certain spatial separation between two or more electrodes.

In another embodiment of the invention, the flow-type body is designed as an outlet nozzle for a central stream from the turbine, and the heater coating extends from an interior side of the flow-type body over the downstream end to an exterior side of the flow-type body. As a result, the coating may reliably heat a relatively large surface area at one end of a flow-type body, thereby reliably preventing ice formation.

In another embodiment, the electrodes are each arranged on faces of the heater coating, and essentially extend perpendicular to the direction of extension of the heater coating or flow-type body. In one implementation, the coating would thus be a flat rectangle, whose two opposing shorter edges accommodate the electrodes, thereby resulting in a largely uniform flow of current through the entire coating.

Another embodiment of the invention, the electrodes are annularly arranged on the heater coating, essentially parallel to the surface area of the flow-type body. The surface area here refers to the local surface exposed to the action of the heater coating. A first electrode is here preferably applied flatly to the interior side of the flow-type body, while a second electrode is applied flatly to the exterior side of the flow-type body. The heater coating here likewise extends from the exterior side to the interior side of the flow-type body, and in so doing envelops the two electrodes. This arrangement is especially well suited for equipping a flow-type body shaped like an outlet nozzle. As a result, the configuration consisting of a heater coating and electrodes can be rather flat, while a comparatively large surface area is simultaneously used for applying a voltage. Further, the distance between the two electrodes is very short, so that a moderate level of applied voltage can be selected. Exposing a large area of the trailing edge to be heated yields a uniform flow of current, and hence a uniform heating over the entire circumference of the flow-type body, without gaps coming about. In addition, applying the heater coating with the electrodes arranged on the inside and outside is very easy, since this makes it possible to simply immerse the trailing edge of the flow-type body fitted with the electrodes into a liquid matrix material.

In another embodiment of the invention, at least one of the electrodes is regionally interrupted, wherein adjacent sections of a respective electrode are connected with varying polarities of a voltage source. A flow of current in several directions can arise between the individual sections of the electrodes as a result, which also leads to an especially uniform heating.

A method for manufacturing a heated coating on a flow-type body. The method essentially involves the steps of arranging two electrodes at one end of the flow-type body, coating the trailing edge with a matrix material exhibiting the conductivity additive, and curing the matrix material.

The flow-type body is here preferably coated in such a way that the electrodes arranged at the trailing edge are completely covered by the matrix material, and can be realized by spraying, painting or preferably through immersion into a resin-like matrix material with a dispersed conductivity additive.

Curing may further be accomplished purely via air drying or through exposure to heat. The latter would make sense when using heat curing matrix materials.

The electrodes may be arranged on the flow-type body in such a way that they flatly abut against an interior side and the exterior side of the flow-type body, and preferably, but not mandatorily, are joined with the flow-type body via an adhesive layer, an adhesive film or the like.

Furthermore the use of a coating comprised of a matrix material with a conductivity additive as the heater coating to prevent ice formation on a flow-type body of a wind tunnel model is provided.

BRIEF DESCRIPTION OF THE FIGURES

Additional features, advantages and possible applications of the present invention may be gleaned from the following description of exemplary embodiments and the figures. All described and/or graphically depicted features here constitute the subject matter of the invention, whether taken separately or in any combination, even independently of their composition in the individual claims or back references thereto. In addition, the same reference numbers on the figures denote the same or similar objects.

DETAILED DESCRIPTION

Figure 1:
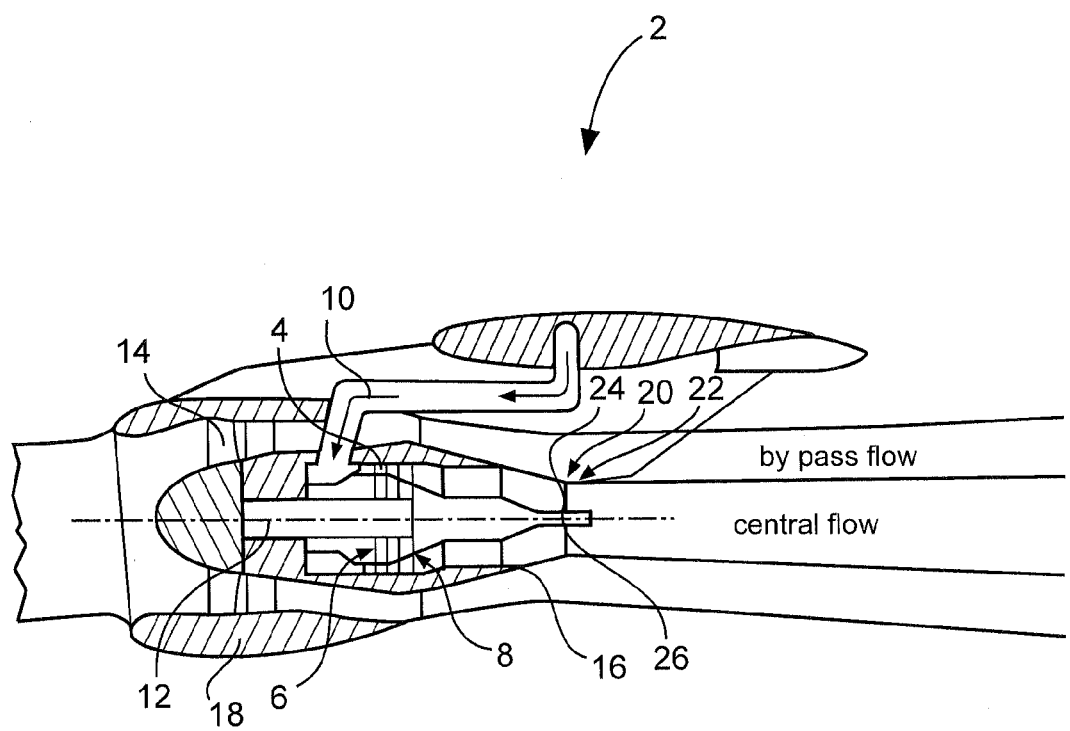
FIG. 1 shows a sectional view of an engine simulator for wind tunnel models.

An engine simulator 2 in FIG. 1 for simulating a bypass engine on a wind tunnel model for an aircraft exhibits a rotatably mounted turbine 4 exemplarily depicted with two stages, which has an inlet 6 and an outlet 8, and is made to rotate by a pressurized fluid from a feed line 10. The fluid gets from the inlet 6 into the turbine 4, there imparts a rotation to the turbine 4 and a ducted fan 14 connected with the turbine 4 via a shaft 12, and flows out of the engine simulator 2 as a central stream through the outlet 8 from a flow-type body 16.

The ducted fan 14 is enveloped by a jacket 18, which leads to an annular bypass flow streaming by between the flow-type body 16 and jacket 18. In the area of a downstream end of the flow-type body 16 designed as a trailing edge 20, the bypass flow and central stream from the turbine 4 come into contact, so that the two air flows become mixed together in an area at the trailing edge 20. In the thoroughly mixed area, the relieving fluid causes a distinctly lower temperature to be reached than that of the pure bypass flow, so that at least the thoroughly mixed portion of the flow reaches the dew point in the area of the trailing edge 20, which leads to water condensing out in the area of the trailing edge 20, wherein the condensate exhibits a tendency to form ice due to the low temperature of the fluid streaming by. As a consequence, a kind of ice crown would form at the trailing edge 20 without influencing the surface temperature of the flow-type body 16, extending along the boundary between the central stream and bypass flow out of the flow-type body 16.

Figure 2:
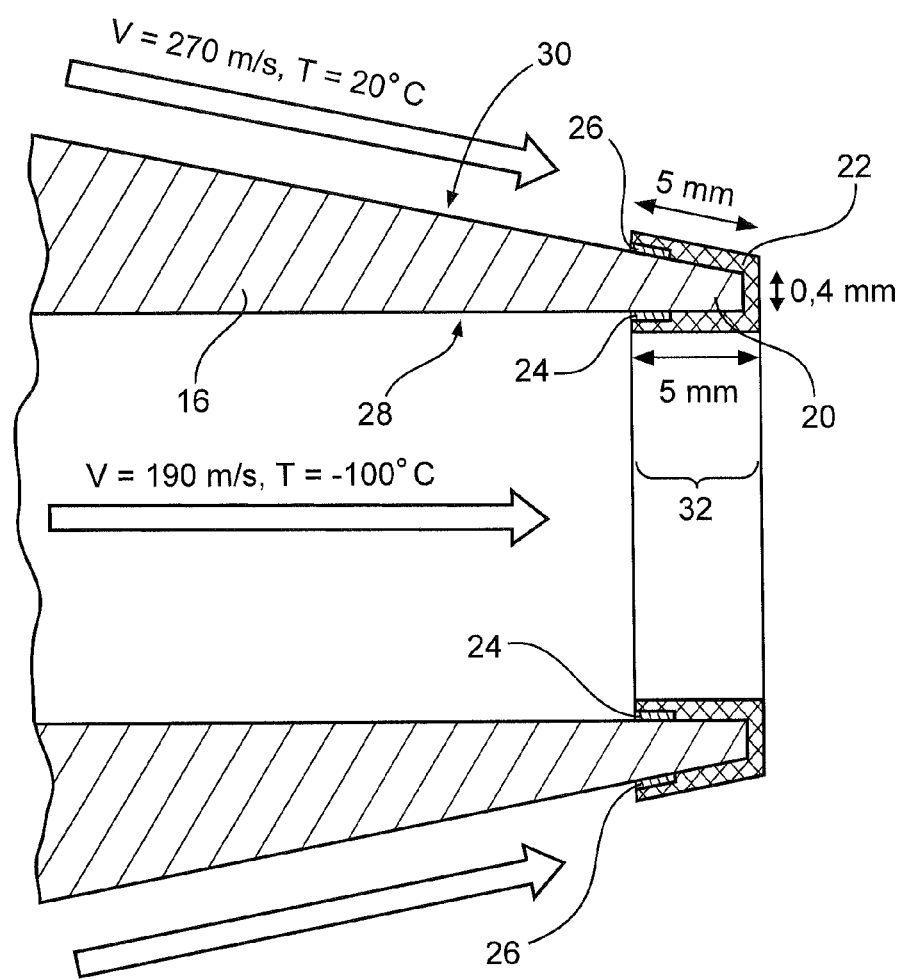
FIG. 2 shows a sectional view of the trailing edge of a flow-type body with a coating.

In order to prevent this ice formation, the trailing edge 20 is provided with a heater coating 22, which is shown in more detail on FIG. 2. The latter consists of a matrix material incorporating a conductivity additive, such as dispersed carbon particles or the like. Two electrodes 24 and 26 are used to apply a voltage to the heater coating 22, which owing to the conductivity results in a current flowing through the heater coating 22, thereby heating the trailing edge 20. Ice formation on the trailing edge 20 can be effectively prevented in this way.

FIG. 2 shows a somewhat more detailed view of the outlet area of the nozzle-like flow-type body 16. The heater coating 22 is located on the trailing edge 20 as a thin layer, which extends from an interior side 28 to an exterior side 30 of the flow-type body 16, so as to completely cover an outlet area 32 of the flow-type body 16. In order to introduce a voltage, a first electrode 24 is annularly and flatly arranged on the interior side 28 of the flow-type body 16, while a second electrode 26 is annularly and flatly arranged on the exterior side of the flow-type body 16. The heater coating 22 completely envelops the two film- or sheet-like, molded electrodes 24 and 26, so that an applied voltage from a voltage source (not shown)

leads to a flow of current in the heater coating 22, and hence to the introduction of heat in the entire trailing edge area.

In a realizable engine simulator, for example, the lead-out areas 32 can extend along a length of 5 mm, while the entire thickness of the lead-out area at the trailing edge 20 can measure less than 1 mm. The coating 22 can exhibit so thin a design as to practically rule out any influence of the stream around the flow-type body 16.

Figure 3A:
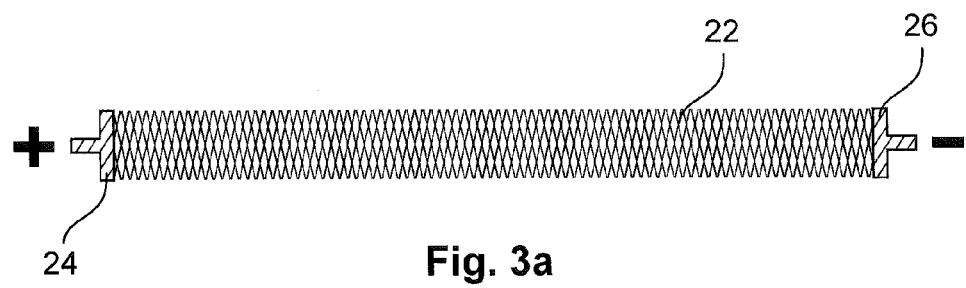
FIGS. 3a-3c show a diagrammatic view of an arrangement of electrodes.
Figure 3B:
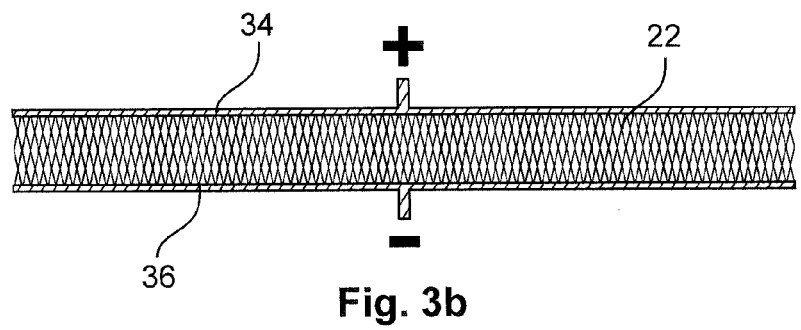
Figure 3C:
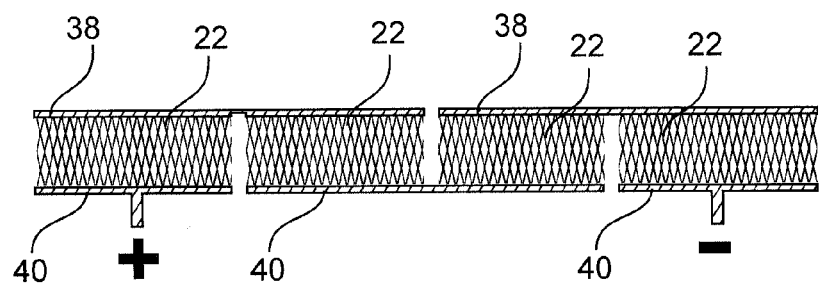

FIGS. 3a to 3c depict several possibilities for arranging electrodes 24 and 26. In the view on FIG. 3a, the coating 22 is shown after unwound, and its faces are each provided with a pole of a voltage source.

FIG. 3b shows a deviating arrangement corresponding to the arrangement from FIG. 2, in which an upper side and lower side of a heater coating 22 are each connected with a pole of a voltage source. For example, the above could be designed in such a way that the flow-type body 16 from FIG. 2 exhibits a respective band-like electrode 34, 36 connected with the heater coating 22 at the ends of the coating, on an interior side and an exterior side.

FIG. 3c depicts a meandering configuration of individual electrode sections 38 and 40. Situated on each side of the heater coating is an arrangement of electrodes 38 or 40, which are separated from each other by gaps. The adjacent electrodes 38 or 40 can alternately be connected with varying poles of the voltage source.

Figure 4:
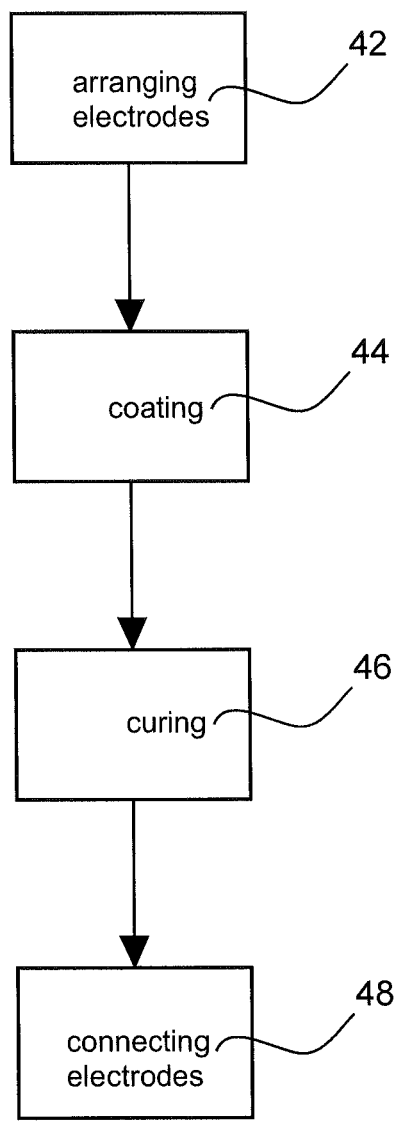
FIG. 4 shows a diagrammatic, block-based view of a method for manufacturing a coating.

Finally, FIG. 4 shows a diagrammatic view of a method according to the invention. A first procedural step 42 may encompass arranging two electrodes on a trailing edge of the flow-type body, coating 44 by way of painting, spraying or immersing the trailing edge in a matrix material exhibiting a conductivity additive, and curing 46. In addition, the method may encompass the connection 48 of electrodes with a respective connection line, which are to be hooked up to a voltage source.

Let it additionally be noted that "exhibiting" or "comprising" does not preclude any other elements or steps, and that "a" or "an" does not rule out a plurality. Let it further be noted that features described with reference to one of the above exemplary embodiments can also be used in combination with other features of other exemplary embodiments described above. Reference numbers in the claims are not to be construed as limitations.

The invention claimed is:

1. An engine simulator for wind tunnel models, comprising:
   a turbine with an inlet for a pressurized fluid and an outlet for a relieved fluid;
   a flow-type body arranged downstream from the turbine;
   a jacket that at least partially envelops the flow-type body with the formation of a gap;
   at least first and second electrodes; and
   a heater coating on a downstream end of the flow-type body, the heater coating comprising a matrix material that contains a conductivity additive and connected with the first and second electrodes for applying an electrical voltage.

2. The engine simulator of claim 1, wherein at least one of the at least first and second electrodes is configured as a metal band.

3. The engine simulator of claim 1, wherein at least one of the first and second electrodes is arranged between the heater coating and the area of the end of the flow-type body covered by the heater coating.

4. The engine simulator of claim 1, wherein the flow-type body is configured as an outlet nozzle for a central flow from the turbine, and wherein the heater coating extends from an interior side of the flow-type body over the downstream end to an exterior side of the flow-type body.

5. The engine simulator of claim 1, wherein the first and second electrodes are arranged on the faces of the heater coating, respectively, and essentially extend perpendicular to the direction of extension of the heater coating or the flow-type body.

6. The engine simulator of claim 1, wherein the first and second electrodes are annularly arranged on the heater coating, essentially parallel to the surface area of the flow-type body.

7. The engine simulator of claim 1, wherein at least one of the first and second electrodes is regionally interrupted, wherein adjacent sections of the at least one of the first and second electrodes are connected with different polarities of a voltage source.

* * * * *